United States Patent
Zhang (10) Patent No.: US 12,487,605 B2
(45) Date of Patent: Dec. 2, 2025

(54) METHOD OF CONTROLLING AN AIRCRAFT, FLIGHT CONTROL DEVICE FOR AN AIRCRAFT, AND AIRCRAFT WITH SUCH FLIGHT CONTROL DEVICE

(71) Applicant: AUTEL ROBOTICS CO., LTD., Guangdong (CN)

(72) Inventor: Tianbao Zhang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 327 days.

(21) Appl. No.: 17/659,694

(22) Filed: Apr. 19, 2022

(65) Prior Publication Data
US 2022/0244746 A1 Aug. 4, 2022

Related U.S. Application Data

(63) Continuation of application No. PCT/CN2020/122542, filed on Oct. 21, 2020.

(30) Foreign Application Priority Data

Oct. 21, 2019 (CN) .......................... 201911001436.1

(51) Int. Cl.
*G05D 1/00* (2024.01)
*B64U 50/19* (2023.01)
*H03K 7/08* (2006.01)

(52) U.S. Cl.
CPC ........... *G05D 1/101* (2013.01); *G05D 1/0016* (2013.01); *G05D 1/0669* (2013.01); *H03K 7/08* (2013.01); *B64U 50/19* (2023.01); *B64U 2201/20* (2023.01)

(58) Field of Classification Search
CPC .... G05D 1/101; G05D 1/0016; G05D 1/0669; G05D 1/0094; B64C 39/024;
(Continued)

(56) References Cited

U.S. PATENT DOCUMENTS

2008/0119970 A1* 5/2008 Campbell ............ G05D 1/0676
701/4
2014/0252162 A1* 9/2014 Teller ..................... B64U 70/93
244/63
(Continued)

FOREIGN PATENT DOCUMENTS

CN 104714557 A 6/2015
CN 104808674 A 7/2015
(Continued)

OTHER PUBLICATIONS

PCT International Search Report mailed Jan. 22, 2021; PCT/CN/2020/122542 with English translation.

*Primary Examiner* — Helal A Algahaim
*Assistant Examiner* — Karen Lynelle Furgason
(74) *Attorney, Agent, or Firm* — Frank Gao, Esq.

(57) ABSTRACT

Embodiments of the present invention relate to a method of controlling an aircraft and a flight control device for an aircraft, an aircraft with such flight control device and a storage medium. The method includes: determining a flight mode adopted by the aircraft in a non-static state; if the flight mode is an absolute hovering mode, determining a target speed of the aircraft according to a current flight speed, a current flight height and a first preset hovering height of the aircraft and a remote control speed set for the aircraft by remote control device; if the flight mode is a relative static hovering mode, determining the target speed of the aircraft according to a relative flight speed, the current flight height, a second preset switching hovering height and the remote control speed; and controlling the aircraft to fly according to the target speed.

9 Claims, 5 Drawing Sheets

(58) Field of Classification Search
CPC ...... B64U 2201/20; H03K 7/08; G01C 21/28; G01C 21/3848
See application file for complete search history.

(56) References Cited

U.S. PATENT DOCUMENTS

| | | | | |
|---|---|---|---|---|
| 2016/0068267 | A1* | 3/2016 | Liu | G05D 1/042 |
| | | | | 701/4 |
| 2016/0327950 | A1* | 11/2016 | Bachrach | B64C 39/024 |
| 2018/0150718 | A1* | 5/2018 | Omari | B64D 47/08 |
| 2018/0181117 | A1* | 6/2018 | Rosenberg | G05D 1/0038 |
| 2019/0056725 | A1* | 2/2019 | Su | G05D 1/08 |
| 2020/0293066 | A1* | 9/2020 | Shibata | G05D 1/042 |

FOREIGN PATENT DOCUMENTS

| | | | |
|---|---|---|---|
| CN | 106054926 | A | 10/2016 |
| CN | 107003678 | A | 8/2017 |
| CN | 107037819 | A | 8/2017 |
| CN | 107291095 | A | 10/2017 |
| CN | 108466567 | A | 8/2018 |
| CN | 108780325 | A | 11/2018 |
| CN | 108873930 | A | 11/2018 |
| CN | 110262539 | A | 9/2019 |
| CN | 110597296 | A | 12/2019 |
| EP | 1407965 | A1 | 4/2004 |

* cited by examiner

METHOD OF CONTROLLING AN AIRCRAFT, FLIGHT CONTROL DEVICE FOR AN AIRCRAFT, AND AIRCRAFT WITH SUCH FLIGHT CONTROL DEVICE

CROSS-REFERENCE TO RELATED APPLICATIONS

The present application is a continuation of the International Application No. PCT/CN2020/122542, filed on Oct. 21, 2020, which claims priority of Chinese patent No. 201911001436.1, filed on Oct. 21, 2019, both of which are hereby incorporated by reference in their entireties.

BACKGROUND

Technical Field

Embodiments of the present disclosure relate to the technical field of aircrafts, in particular to a method of controlling an aircraft and a flight control device for an aircraft, an aircraft with such fight control device and a storage medium.

Related Art

With a rapid development of an aircraft technology, functions such as safety monitoring or aerial photographing of an aircraft have been rapidly popularized to the daily life of people.

Currently, before the aircraft is controlled to take off, various parameters such as an attitude angle and a speed of the aircraft are initialized, and an inertial navigation device such as a gyroscope sensor and an acceleration sensor is generally disposed on a navigation control system for the aircraft to control initialization and flight. At the moment, the initialization of the aircraft can be achieved only when the inertial navigation device is on a static plane.

However, with the popularization of marine amusement activities, there is a higher and higher demand on the aircraft which is initialized and takes off on a marine vehicle such as a ship or yacht to monitor marine safety and other tasks. During marine navigation, the marine vehicle is always in a wobbling or advancing state under the action of a water flow, so that the aircraft may not be controlled to be initialized on a completely static plane, and then, it is difficult for the aircraft to take off on the sea.

SUMMARY

Embodiments of the present disclosure provide a method of controlling an aircraft and a flight control device for an aircraft, an aircraft with such flight control device and a storage medium. The aircraft is controlled to successfully fly in a non-static state, so that the flight safety of the aircraft is improved.

In a first aspect, an embodiment of the present disclosure provides a method of controlling an aircraft. The method includes:

determining a flight mode adopted by the aircraft in a non-static state;

if the flight mode is an absolute hovering mode, determining a target speed of the aircraft according to a current flight speed, a current flight height, a first preset hovering height of the aircraft and a remote control speed set for the aircraft by remote control device;

if the flight mode is a relative hovering mode, determining the target speed of the aircraft according to a relative flight speed, the current flight height, a second preset hovering height of the aircraft in the non-static state and the remote control speed set for the aircraft by the remote control device; and controlling the aircraft to fly according to the target speed.

In a second aspect, an embodiment of the present disclosure provides a flight control device for an aircraft. The device includes:

a flight mode determination module, configured to determine a flight mode adopted by the aircraft in a non-static state;

a first mode operation module, configured to: determine a target speed of the aircraft if the flight mode is an absolute hovering mode, according to a current flight speed, a current flight height, a first preset hovering height of the aircraft and a remote control speed set for the aircraft by remote control device;

a second mode operation module, configured to: determine the target speed of the aircraft, if the flight mode is a relative hovering mode, according to a relative flight speed, the current flight height, a second preset hovering height of the aircraft in the non-static state and the remote control speed set for the aircraft by the remote control device; and a flight control module, configured to: control the aircraft to fly according to the target speed.

In a third aspect, an embodiment of the present disclosure provides an aircraft. The aircraft includes:

one or more processors; and a storage device for storing one or more programs;

the one or more programs when executed by the one or more processors causing the one or more processor to perform the method of controlling an aircraft according to any embodiment of the present disclosure.

In a fourth aspect, an embodiment of the present disclosure provides a computer readable storage medium storing a computer program, wherein the program when executed by a processor causes the processor to perform the method of controlling an aircraft according to any embodiment of the present disclosure.

Embodiments of the present disclosure provide a method of controlling an aircraft and a fight control device for an aircraft, the aircraft with such fight control device and a storage medium. If the aircraft currently adopts an absolute hovering mode in a non-static state, a target speed at the next moment is determined according to the current flight speed, the current flight height, a first preset hovering height of the aircraft and a remote control speed set for the aircraft by remote control device, and the aircraft is controlled to fly according to the target speed, to ensure that the aircraft can hover in the air. If the aircraft currently adopts a relative hovering mode in the non-static state, the target speed at the next moment is determined according to the relative flight speed, the current flight height and the second preset hovering height of the aircraft in the non-static state and the remote control speed set for the aircraft by the remote control device, and the aircraft is controlled to fly according to the target speed, to ensure that the aircraft can synchronously fly with a non-static reference object, and the relative flight of the aircraft in the non-static state is achieved. Then, it is ensured that the aircraft is controlled in the non-static state to successfully fly in the above-mentioned two flight modes, and the flight safety of the aircraft is improved.

BRIEF DESCRIPTION OF THE DRAWINGS

Other features, objectives and advantages of the present disclosure will become more apparent by reading detailed descriptions of non-restrictive embodiments with reference to the following accompanying drawings.

DETAILED DESCRIPTION

The present disclosure will be further described in detail below in conjunction with the accompanying drawings and embodiments. It can be understood that specific embodiments described herein are merely intended to explain the present disclosure, rather than to limit the present disclosure. In addition, it should be further noted that parts rather than the overall structure, relevant to the present disclosure, are merely shown in the accompanying drawings in order to facilitate description. In addition, embodiments in the present disclosure and features in the embodiments can be combined with each other without conflicts.

Embodiment 1

Figure 1:
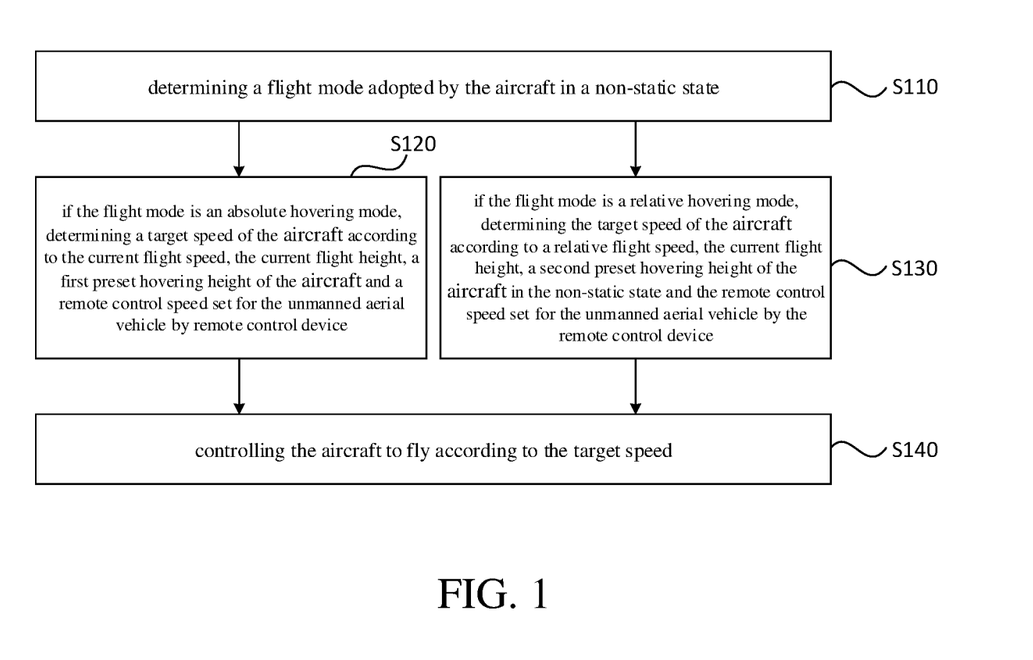
FIG. 1 is a process diagram of a method of controlling an aircraft according to an embodiment 1 of the present disclosure.

FIG. 1 is a process diagram of a method of controlling an aircraft according to an embodiment 1 of the present disclosure. The present embodiment is applicable to any situation that the aircraft is controlled to fly in a non-static state. The method of controlling the aircraft according to the present embodiment may be executed by a flight control device for an aircraft according to an embodiment of the present disclosure, and the device may be implemented in a mode of software and/or hardware and is integrated in the aircraft executing the present method.

Specifically, referring to FIG. 1, the method may include the following steps:

In S110, a flight mode adopted by the aircraft in a non-static state is determined.

Specifically, at present, more and more safety monitoring systems perform aerial photographing of amusement activities on the land or sea by an aircraft to monitor safety of a user in an amusement process in real time. When the aircraft is controlled to fly on the sea, monitoring personnel may firstly have a sea trip by a marine vehicle such as a ship or yacht, initialize various parameters such as an attitude angle and speed of the aircraft in a voyage and control the aircraft to take off after the initialization is successful. At the moment, the marine vehicle such as the ship or yacht may wobble or navigate on the sea all the time due to an action of a water flow, and therefore, when being controlled to take off, the aircraft may wobble or fly with the marine vehicle such as the ship or yacht so as to be in the non-static state.

Meanwhile, the monitoring personnel controls the aircraft to take off in the non-static state. If the aircraft takes off on the marine vehicle such as the ship or yacht, there are two flight modes: an absolute hovering mode and a relative hovering mode. The absolute hovering mode means that: after taking off in the non-static state, the aircraft may gradually and stably hover on a certain fixed position in the air and is no longer in flight. The relative hovering mode means that the aircraft may be gradually stabilized on a certain height in the air and synchronously fly with a non-static reference object after taking off in the non-static state, for example, the aircraft synchronously moves in the air with the marine vehicle such as the chip or yacht.

Optionally, before the monitoring personnel controls the aircraft to take off in the non-static state, the flight mode adopted in this flight of the aircraft may be selected firstly. Specifically, the monitoring personnel have a remote control device capable of remotely controlling the aircraft to achieve various flight function configurations, and may select the flight mode adopted in this flight of the aircraft on a display interface of the remote control device and send the configuration selection of the flight mode to the aircraft in a remote control manner, so that the aircraft subsequently flies in a flight manner matched with the flight mode.

In addition, before being controlled to take off, the aircraft is further required to be initialized, therefore, the present embodiment may further include: initializing the aircraft according to state parameters of the aircraft under a preset takeoff standard.

Specifically, the preset takeoff standard means that the various state parameters acquired at a certain moment when the aircraft is in the non-static state are closest to parameters in a static state, and the state of the aircraft at this moment is used as a relatively static state. In the present embodiment, state data, including an accelerated speed of the aircraft at the current moment and an angular speed under three axes of a gyroscope, of the aircraft at the current moment may be acquired in real time, by equipping the gyroscope sensor and an accelerometer on the aircraft. Thus, it is determined whether the accelerated speed is smaller than or equal to a preset accelerated speed threshold and the angular speed under the three axes of the gyroscope is smaller than or equal to a preset angular speed threshold, wherein the preset accelerated speed threshold and the preset angular speed threshold are critical values of the aircraft under the preset takeoff standard in the present embodiment. If either the current accelerated speed is greater than the preset acceleration threshold or and the angular speed is greater than the preset angular speed threshold, it is regarded that the aircraft is higher in wobbling degree and is not in the static state at the current moment. The preset takeoff standard in the present embodiment is met when the current accelerated speed is smaller than or equal to the preset accelerated speed threshold and the angular speed value under the three axes of the gyroscope is smaller than or equal to the preset angular speed threshold, and the attitude angle of the aircraft is initialized according to the various state parameters of the aircraft at the current moment. After the initialization of the attitude angle is completed, corresponding satellite navigation data is acquired to determine whether satellite navigation equipped with the aircraft is ready. If the satellite navigation is not ready, corresponding accelerated speed and angular speed are further acquired, and initialization is performed once again. If the satellite navigation is ready, the speed of the aircraft is initialized, and the aircraft is controlled to enter an unlocking-allowed takeoff waiting mode. The monitoring personnel performs a corresponding unlocking operation on the remote control device to further unlock the aircraft, and thus, the monitoring personnel selects the current flight mode and controls the aircraft to take off.

In S120, if the flight mode is an absolute hovering mode, a target speed of the aircraft is determined according to a current flight speed, a current flight height and a first preset hovering height of the aircraft and a remote control speed set for the aircraft by remote control device.

The current flight speed of the aircraft refers to an actual flight speed of the aircraft at the current moment and may be determined by real-time monitoring performed by a satellite navigation module and an accelerometer pre-equipped with the aircraft, and the satellite navigation module may be a GPS positioning module or Beidou positioning module and the like. The current flight height refers to a height of the aircraft relative to the ground plane at the current moment and may be determined by real-time monitoring performed by a satellite navigation module, an air pressure gauge and an ultrasonic ranging module pre-equipped with the aircraft. The first preset hovering height refers to a height where the aircraft finally keeps stably hovering in the air in the absolute hovering mode after taking off, may be set according to actual demands of the monitoring personnel and the aircraft for safety monitoring of a user taking part in marine amusement and is not limited in the present embodiment. The remote control speed refers to a next-moment flight speed set for the aircraft by the monitoring personnel with the remote control device of the aircraft according to a difference between the current flight condition of the aircraft and a flight condition when the aircraft is in the absolute hovering mode. The remote control device in the present embodiment may be equipped with a corresponding joystick, the monitoring personnel may operate the joystick to move and thus joystick operation information are obtained and transmitted to the aircraft matched with the remote control device, and the aircraft determines the remote control speed at the next moment set by the monitoring personnel according to the joystick operation information.

Specifically, if the flight mode adopted by the aircraft in the non-static state is the absolute hovering mode, a position difference of the aircraft within an extremely short adjacent time interval and the accelerated speed at the current moment are respectively acquired by the satellite navigation module and the accelerometer equipped with the aircraft, and speed data output by the satellite navigation module and accelerated speed data output by the accelerometer are fused to determine the current flight speed of the aircraft. At the same time, heights, respectively output by the satellite navigation module, the air pressure gauge and the ultrasonic ranging module, of the aircraft are fused to obtain the current flight height of the aircraft. Then, the first preset hovering height preset by the monitoring personnel in the absolute hovering mode and the current flight height are compared and analyzed by a pre-equipped height controller, a flight height required to further ascend when the aircraft reaches the first preset hovering height is determined, and an ascending speed of the aircraft in a vertical direction under the flight height which is to ascend is determined by adopting a corresponding adjusting manner. In addition, the joystick operation information transmitted by the remote control device is analyzed by a preset joystick quantity mapping module, and the joystick operation information is converted into a corresponding remote control speed according to a mapping rule preconfigured in the joystick quantity mapping module. In the absolute hovering mode, the actual flight speed of the aircraft includes a speed only in a vertical direction to ensure that the aircraft may overcome effects from its gravity to stay in the air, and therefore, the target speed of the aircraft at the next moment is determined according to the current flight speed of the aircraft, the ascending speed of the aircraft in the vertical direction and the remote control speed set for the aircraft by the remote control device, to enable the aircraft to gradually and stably hover in the air, and to meet the demand on the speed in the absolute hovering mode, that is, to enable the aircraft finally to keep still on the fixed position in the air, and thus, to achieve the absolute hovering of the aircraft in the air.

In S130, if the flight mode is a relative hovering mode, the target speed of the aircraft is determined according to a relative flight speed, the current flight height and a second preset hovering height of the aircraft in the non-static state and the remote control speed set for the aircraft by the remote control device.

The relative flight speed of the aircraft in the non-static state refers to the current flight speed of the aircraft relative to a non-static reference object. For example, when the monitoring personnel controls the aircraft to fly in a navigation process of the marine vehicle such as the ship or yacht, the flight speed of the aircraft relative to the navigation speed of the marine vehicle such as the ship or yacht may be co-determined by the current flight speed of the aircraft and the current navigation speed of the non-static reference object. The second preset hovering height refers to a height where the aircraft finally keeps stabilized in the air in the relative hovering mode after taking off and synchronously moves with the non-static reference object, may be set according to actual demands of the monitoring personnel and the aircraft for safety monitoring of a user taking part in marine amusement and is not limited in the present embodiment.

Optionally, if the flight mode adopted by the aircraft in the non-static state is the relative hovering mode, the current flight speed of the aircraft is determined according to output speeds of the satellite navigation module and the accelerometer on the aircraft, and a corresponding satellite navigation module is further pre-equipped on the non-static reference object, so that the current navigation speed of the non-static reference object is determined. Thus, the relative flight speed of the aircraft relative to the non-static reference object in the non-static state is determined according to the current flight speed of the aircraft and the current navigation speed of the non-static reference object. At the same time, heights, respectively output by the satellite navigation module, the air pressure gauge and the ultrasonic ranging module, of the aircraft are fused to obtain the current flight height of the aircraft. Then, the second preset hovering height preset by the monitoring personnel in the relative hovering mode and the current flight height are compared and analyzed by a pre-equipped height controller, then, a flight height required to further ascend when the aircraft reaches the second preset hovering height is determined, and an ascending speed of the aircraft in a vertical direction under the flight height which is to ascend is determined by adopting a corresponding adjusting manner. In addition, the joystick operation information transmitted by the remote control device is analyzed by a preset joystick quantity mapping module, and the joystick operation information is converted into a corresponding remote control speed according to a mapping rule preconfigured in the joystick quantity mapping module. In the relative hovering mode, actual speeds of the aircraft and the non-static reference object in a horizontal direction are the same, that is, the relative flight speed of the aircraft only includes a speed in a vertical direction to ensure that the aircraft may overcome effects from its gravity to stay in the air, and therefore, the target speed of the aircraft at the next moment is determined according to the relative flight speed of the aircraft in the non-static state, the ascending speed of the aircraft in the vertical direction and the remote control speed set for the aircraft by the remote control device, to enable the aircraft to gradually move with the non-static reference object, and to meet the demand on the speed in the relative hovering mode, that is, to enable the aircraft to be finally stabilized on a certain fixed height in the air and synchronously fly with the non-static reference object. In this way, the aircraft is in a hovering state relative to the non-static reference object in the air.

In S140, the aircraft is controlled to fly according to the target speed.

Specifically, when the target speed of the aircraft at the next moment is acquired in the absolute hovering mode and the relative hovering mode, the aircraft may be controlled to further fly according to the target speed, the target speed at the next moment is determined once again by further adopting the corresponding method of controlling the aircraft in the absolute hovering mode or the relative hovering mode, cyclic operation is performed, and then, the aircraft is controlled to fly.

Optionally, in the present embodiment, the step that the aircraft is controlled to fly according to the target speed may include: generating a corresponding pulse width modulation signal according to the target speed, and controlling the aircraft to fly according to the pulse width modulation signal. Specifically, after the target speed of the aircraft is obtained, the target speed may be input to a corresponding controller, the controller generates the corresponding PWM (Pulse Width Modulation) signal according to the target speed of the aircraft, and the PWM signal is used for controlling a motor in the aircraft to correspondingly rotate so as to drive the aircraft to fly at the target speed at the next moment.

According to technical solutions in the present embodiment, if the aircraft adopts the absolute hovering mode in the non-static state, the target speed at the next moment is determined according to the current flight speed, the current flight height and the first preset hovering height of the aircraft and the remote control speed set for the aircraft by the remote control device, and the aircraft is controlled to fly according to the target speed, to ensure the aircraft can hover in the air. If the aircraft currently adopts the relative hovering mode in the non-static state, the target speed at the next moment is determined according to the relative flight speed, the current flight height and the second preset hovering height of the aircraft in the non-static state and the remote control speed set for the aircraft by the remote control device, and the aircraft is controlled to fly according to the target speed, to ensure that the aircraft can synchronously fly with the non-static reference object, and the relative flight of the aircraft in the non-static state is achieved, then, to further ensure that the aircraft is controlled in the non-static state to successfully fly in the above-mentioned two flight modes, and the flight safety of the aircraft is improved.

Embodiment 2

Figure 2A:
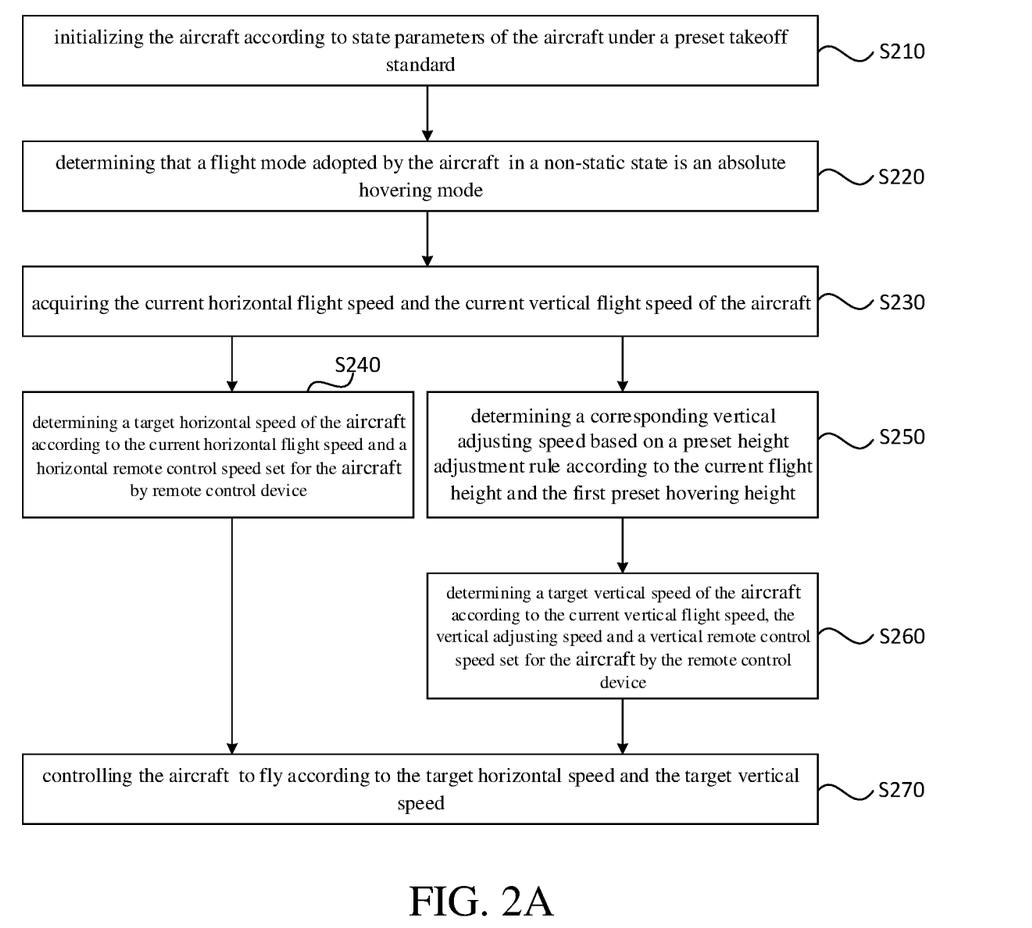
FIG. 2A is a process diagram of a method of controlling an aircraft according to an embodiment 2 of the present disclosure.

FIG. 2A is a process diagram of a method of controlling an aircraft according to an embodiment 2 of the present disclosure. The present embodiment is optimized on the basis of the above-mentioned embodiment. Optionally, when the aircraft is controlled to fly, the flight of the aircraft may be decomposed into flight in a horizontal direction and flight in a vertical direction. In the present embodiment, specific processes of controlling the aircraft to respectively fly in the horizontal direction and the vertical direction in an absolute flight mode are mainly explained and described in detail.

Optionally, as shown in FIG. 2A, the present embodiment may include the following steps.

In S210, the aircraft is initialized according to state parameters of the aircraft under a preset takeoff standard.

In S220, it is determined that a flight mode adopted by the aircraft in a non-static state is an absolute hovering mode.

In S230, the current horizontal flight speed and the current vertical flight speed of the aircraft are acquired.

Specifically, the speed of the aircraft in a flight process may be decomposed into a horizontal speed in the horizontal direction and a vertical speed in the vertical direction. In the present embodiment, adjacent position coordinates, such as the longitude, latitude and height of the aircraft in the flight process, of the aircraft in a three-dimensional space within an adjacent time interval may be acquired according to a satellite navigation module equipped with the aircraft. Then, the current horizontal flight speed of the aircraft is calculated by fusion performed according to a coordinate difference of the longitude and the latitude of the aircraft on a horizontal plane and an accelerated speed component in the horizontal direction, measured by using an accelerometer of the aircraft. In addition, the current vertical flight speed of the aircraft is calculated by fusion performed according to a height difference of the aircraft in the flight process and an accelerated speed component in the vertical direction, measured by using the accelerometer of the aircraft. Thus, the flight speeds of the aircraft in the horizontal direction and the vertical direction are respectively determined.

In S240, a target horizontal speed of the aircraft is determined according to the current horizontal flight speed and a horizontal remote control speed set for the aircraft by remote control device.

Figure 2B:
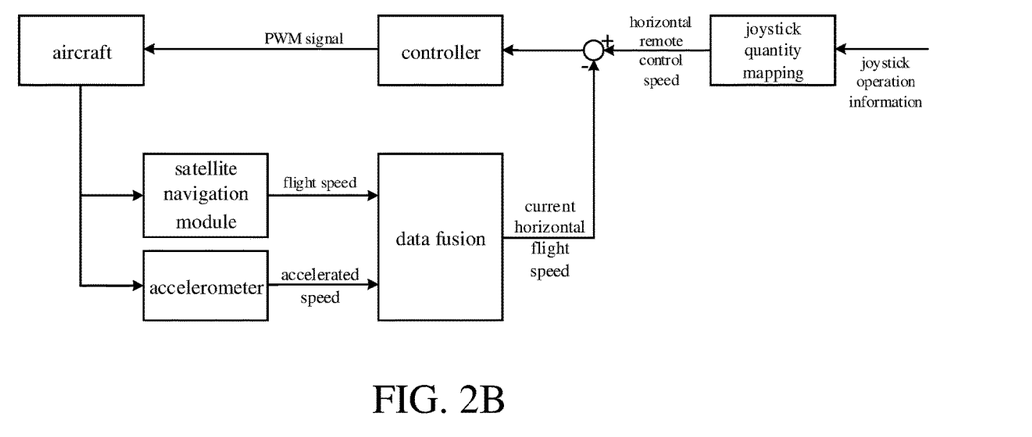
FIG. 2B is a schematic principle diagram of controlling the aircraft to fly in a horizontal direction in an absolute hovering mode according to the embodiment 2 of the present disclosure.

Optionally, when the target horizontal speed in the target speed of the aircraft at the next moment is determined, monitoring personnel operates a joystick on the remote control device to acquire corresponding joystick operation information firstly. As shown in FIG. 2B, the joystick operation information is analyzed by a preset joystick quantity mapping module, the joystick operation information is converted into a corresponding remote control speed according to a mapping rule preconfigured in the joystick quantity mapping module. Then, a horizontal remote control speed in the remote control speed is determined, and a final horizontal speed of the aircraft in the horizontal direction is zero in the absolute hovering mode. The target horizontal speed of the aircraft at the next moment is obtained by the current horizontal flight speed of the aircraft subtracted from the horizontal remote control speed set for the aircraft by the remote control device, so that the horizontal flight speed of the aircraft is gradually close to zero, and the aircraft hovers in the horizontal direction.

In S250, a corresponding vertical adjusting speed is determined based on a preset height adjustment rule according to the current flight height and the first preset hovering height.

Figure 2C:
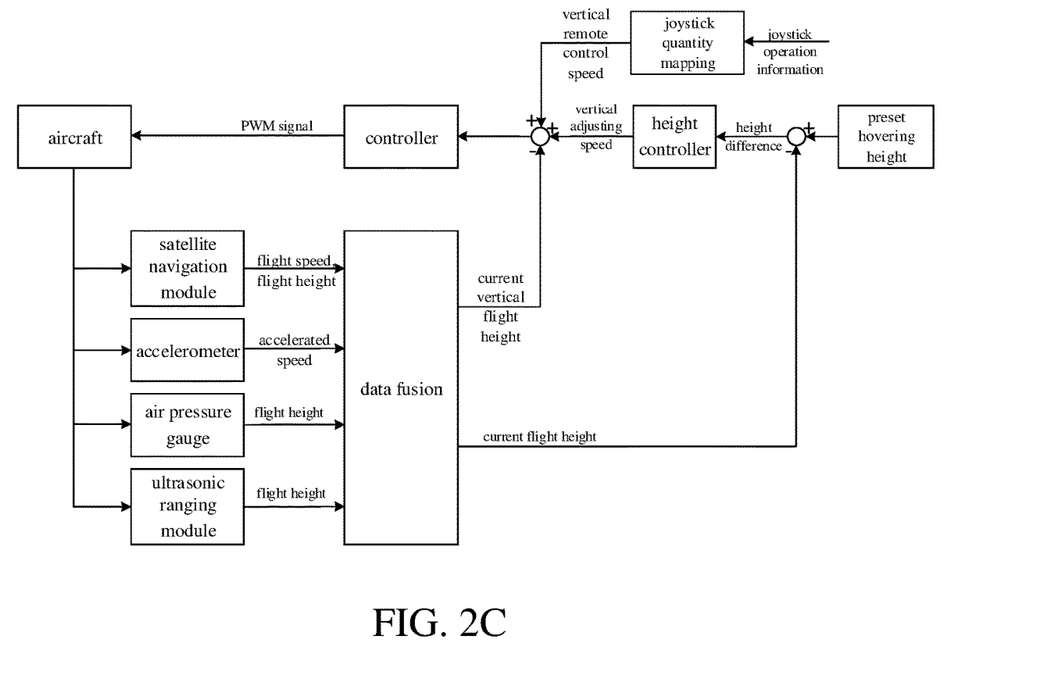
FIG. 2C is a schematic principle diagram of controlling the aircraft to fly in a vertical direction in the absolute hovering mode according to the embodiment 2 of the present disclosure.

Optionally, when the target vertical speed in the target speed of the aircraft at the next moment is determined, corresponding heights of the aircraft needs to be respectively output by the satellite navigation module, the air pressure gauge and the ultrasonic ranging module which are pre-equipped with the aircraft firstly. As shown in FIG. 2C, the current flight height of the aircraft is calculated by fusion performed by adopting a weighted average algorithm according to weights preconfigured for all the modules, and a height difference of both the current flight height and the first preset hovering height in the absolute hovering mode set by the monitoring personnel is calculated, namely a height difference required to further ascend to ensure the aircraft reaches the first preset hovering height. Then, the height difference is input to a corresponding height controller, and is converted according to a height adjustment rule preset in the height controller to obtain a vertical adjusting speed required to be increased when the aircraft is intended to ascend to the first preset hovering height as quickly as possible, and then, the speed of the aircraft in the vertical direction is adjusted according to the vertical adjusting speed, so that the aircraft may hover at the first preset hovering height as quickly as possible.

In S260, a target vertical speed of the aircraft is determined according to the current vertical flight speed, the vertical adjusting speed and a vertical remote control speed set for the aircraft by the remote control device.

Optionally, after the corresponding vertical adjusting speed is obtained, as shown in FIG. 2C, in the absolute hovering mode, the aircraft includes only one upward accelerated speed in the vertical direction to ensure that the aircraft may overcome effects from its gravity to stay in the air. Therefore, in the present embodiment, the target vertical speed of the aircraft at the next moment is obtained by the current vertical flight speed of the aircraft is subtracted from a sum of the vertical adjusting speed and the vertical remote control speed set for the aircraft by the remote control device. Then, the vertical flight speed of the aircraft gradually supports the aircraft to overcome the effects from its gravity, that is, a vertical accelerated speed generated by the target vertical speed is consistent with the gravitational accelerated speed of the aircraft, and thus, the aircraft hovers in the vertical direction.

In S270, the aircraft is controlled to fly according to the target horizontal speed and the target vertical speed.

Optionally, a first PWM signal and a second PWM signal respectively indicating the motor to control the aircraft to fly horizontally and vertically may be respectively determined according to the target horizontal speed and the target vertical speed of the aircraft, and then, the aircraft is respectively driven according to the first PWM signal and the second PWM signal to fly at the corresponding target horizontal speed and target vertical speed respectively in the horizontal direction and the vertical direction at the next moment.

According to technical solution in the present embodiment, if the aircraft adopts the absolute hovering mode in the non-static state, the speeds of the aircraft in the horizontal direction and the vertical direction are respectively analyzed. The target horizontal speed of the aircraft at the next moment is determined according to the current horizontal flight speed and the horizontal remote control speed. The flight height difference of the aircraft is determined according to the current flight height and the first preset hovering height, then, the vertical adjusting speed is determined. The target vertical speed of the aircraft at the next moment is determined according to the current vertical flight speed, the vertical remote control speed and the vertical adjusting speed. The aircraft is controlled to respectively fly in the horizontal direction and the vertical direction, so that the aircraft can finally hover in the air, to ensure that the aircraft is controlled in the non-static state to successfully fly in the absolute hovering mode, and the flight safety of the aircraft is improved.

Embodiment 3

Figure 3A:
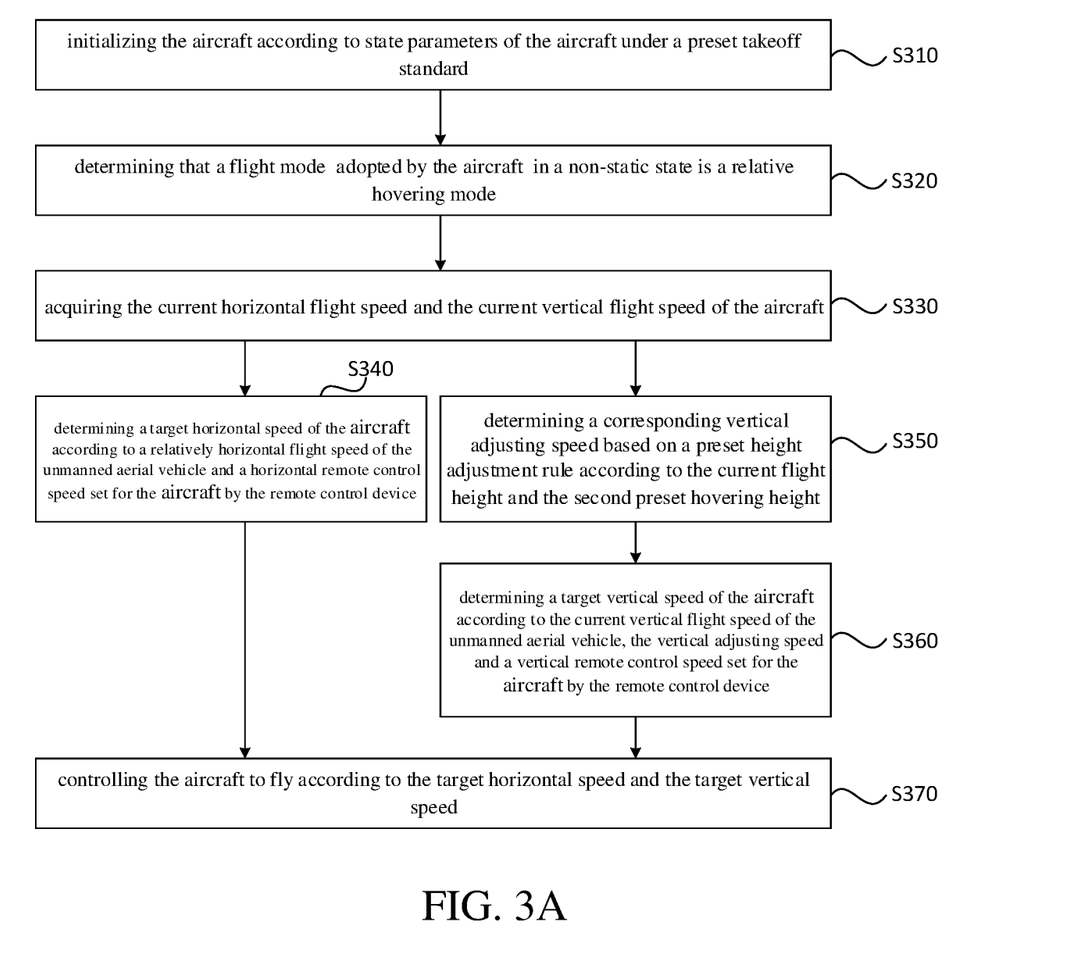
FIG. 3A is a process diagram of a method of controlling an aircraft according to an embodiment 3 of the present disclosure.

FIG. 3A is a process diagram of a method of controlling an aircraft according to an embodiment 3 of the present disclosure. The present embodiment is optimized on the basis of the above-mentioned embodiment. Optionally, when the aircraft is controlled to fly, the flight of the aircraft may be decomposed into flight in a horizontal direction and flight in a vertical direction. In the present embodiment, specific processes of controlling the aircraft to respectively fly in the horizontal direction and the vertical direction in a relative flight mode are mainly explained and described in details.

Optionally, as shown in FIG. 3A, the present embodiment may include the following steps.

In S310, the aircraft is initialized according to state parameters of the aircraft under a preset takeoff standard.

In S320, it is determined that a flight mode currently adopted by the aircraft in a non-static state is a relative hovering mode.

In S330, the current horizontal flight speed and the current vertical flight speed of the aircraft are acquired.

In S340, a target horizontal speed of the aircraft is determined according to a relatively horizontal flight speed of the aircraft and a horizontal remote control speed set for the aircraft by the remote control device.

Optionally, a non-static reference object navigates only in the horizontal direction, the speed in the vertical direction is zero all the time, and therefore, a relative flight speed of the aircraft in the non-static state consists of a relatively horizontal flight speed of the aircraft relative to the non-static reference object in the horizontal direction and the current vertical flight speed of the aircraft. At the moment, the relatively horizontal flight speed may be determined by performing the following steps: determining a first horizontal relative speed of the aircraft according to the current horizontal flight speed and the current speed of the remote control device; determining a second horizontal relative speed of the aircraft according to a difference of at least two images acquired by the aircraft in a flight process; and obtain the relatively horizontal flight speed of the aircraft in the non-static state by fusing the first horizontal relative speed and the second horizontal relative speed.

Figure 3B:
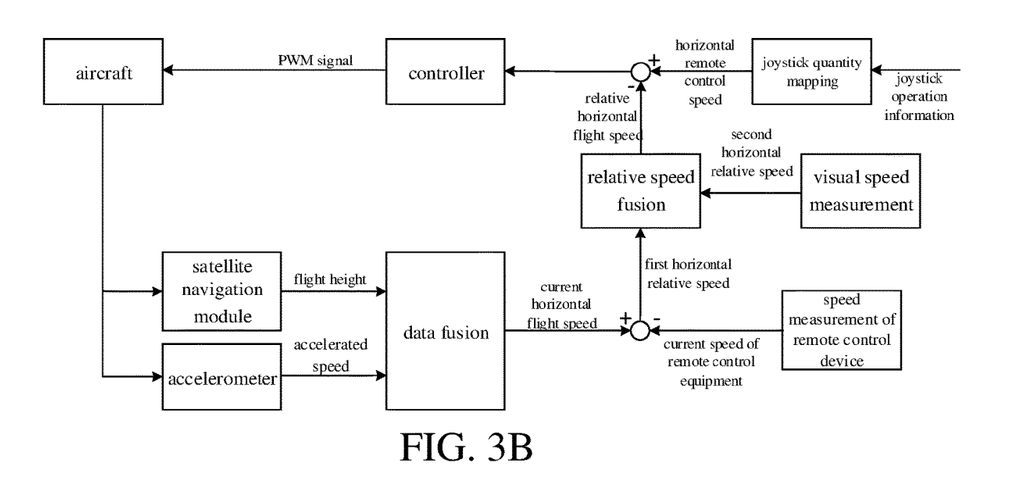
FIG. 3B is a schematic principle diagram of controlling the aircraft to fly in a horizontal direction in a relative hovering mode according to the embodiment 3 of the present disclosure.

Specifically, the remote control device of the aircraft is equipped with the non-static reference object, and therefore, the current speed of the remote control device is the current speed of the non-static reference object. Therefore, as shown in FIG. 3B, the first horizontal relative speed of the aircraft relative to the non-static reference object may be obtained according to a difference, of the current horizontal flight speed of the aircraft obtained by fusion performed by the satellite navigation module and the accelerometer, and the current speed of the remote control device. Meanwhile, the aircraft may be pre-equipped with a corresponding vision module used for sequentially photographing an image of the non-static reference object in the flight process of the aircraft within an extremely short time interval, and therefore, the second horizontal relative speed may be calculated according to a contrast of non-static reference objects in the at least two images acquired by the aircraft in the flight process. And then, the relatively horizontal flight speed of the aircraft in the non-static state is obtained by fusing the first horizontal relative speed and the second horizontal relative speed by weighing and summing the same according to the preset weights of the first horizontal relative speed and the second horizontal relative speed.

Optionally, after the relatively horizontal flight speed of the aircraft relative to the non-static reference object is determined, monitoring personnel operates a joystick on the remote control device to acquire corresponding joystick operation information firstly. As shown in FIG. 3B, the joystick operation information is analyzed by a preset joystick quantity mapping module, the joystick operation information is converted into a corresponding remote control speed according to a mapping rule preconfigured in the joystick quantity mapping module, and a horizontal remote control speed in the remote control speed is determined. And meanwhile, a final relatively horizontal speed of the aircraft in the horizontal direction is zero in the relative hovering mode, so that the relatively horizontal flight speed of the aircraft is subtracted by the horizontal remote control speed set for the aircraft by the remote control device to obtain the target horizontal speed of the aircraft at the next moment. Thus, the relatively horizontal flight speed of the aircraft is gradually close to zero, and then, the aircraft hovers in the horizontal direction.

In S350, a corresponding vertical adjusting speed is determined based on a preset height adjustment rule according to the current flight height and the second preset hovering height.

In S360, a target vertical speed of the aircraft is determined according to the current vertical flight speed of the aircraft, the vertical adjusting speed and a vertical remote control speed set for the aircraft by the remote control device.

Specifically, in the absolute hovering mode and the relative hovering mode, the final hovering states in the vertical direction are consistent, and therefore, in the present embodiment, a manner of determining the target vertical speed of the aircraft in the relative hovering mode is the same as that in the absolute hovering mode, except that the first preset hovering height in the absolute hovering mode is replaced with the second preset hovering height in the relative hovering mode, which is not specifically described herein.

Further, in the present embodiment, when the relative hovering mode is adopted, in order to ensure that the aircraft no longer moves synchronously with the non-static reference object after ascending to a certain height, the flight mode of the aircraft may be automatically switched. At the moment, the present embodiment may further include: controlling the flight mode of the aircraft to be switched into the absolute hovering mode, if the current flight height of the aircraft is greater than or equal to a preset switching height.

Specifically, the preset switching height is preset by the monitoring personnel. In the present embodiment, the current flight height of the aircraft in the relative hovering mode is monitored in real time. When the current flight height of the aircraft is greater than or equal to the preset switching height, the flight mode of the aircraft is directly controlled to be switched from the relative hovering mode to the absolute hovering mode, and the aircraft is controlled to fly in a flight control manner corresponding to the absolute hovering mode after the switching is completed, so that the aircraft absolutely hovers in the air finally.

In S370, the aircraft is controlled to fly according to the target horizontal speed and the target vertical speed.

According to technical solutions in the present embodiment, if the aircraft currently adopts the relative hovering mode in the non-static state, speeds of the aircraft in the horizontal direction and the vertical direction are respectively analyzed. The target horizontal speed of the aircraft at the next moment is determined according to the relatively horizontal flight speed and the horizontal remote control speed, and the target vertical speed of the aircraft at the next moment is determined according to a manner of determining the speed in the vertical direction in the absolute hovering mode, so that the flight of the aircraft in the horizontal direction and the vertical direction are respectively controlled. Therefore, the aircraft may move synchronously with the non-static reference object in the air finally, to ensure that the aircraft is controlled in the non-static state to successfully fly in the relative hovering mode, and the flight safety of the aircraft is improved.

Embodiment 4

Figure 4:
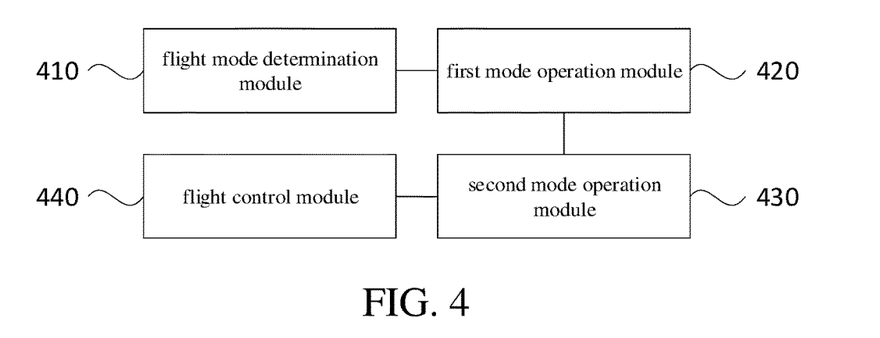
FIG. 4 is a schematic structural diagram of a flight control device for an aircraft according to an embodiment 4 of the present disclosure.

FIG. 4 is a schematic structural diagram of a flight control device for an aircraft according to an embodiment 4 of the present disclosure. As shown in FIG. 4, the device may include:

a flight mode determination module 410, configured to determine a flight mode currently adopted by the aircraft in a non-static state;

a first mode operation module 420, configured to: determine a target speed of the aircraft, if the flight mode is an absolute hovering mode, according to a current flight speed, a current flight height and a first preset hovering height of the aircraft and a remote control speed set for the aircraft by remote control device;

a second mode operation module 430, configured to: determine the target speed of the aircraft, if the flight mode is a relative hovering mode, according to a relative flight speed, the current flight height and a second preset hovering height of the aircraft in the non-static state and the remote control speed set for the aircraft by the remote control device; and a flight control module 440, configured to control the aircraft to fly according to the target speed.

According to technical solutions in the present embodiment, if the aircraft currently adopts the absolute hovering mode in the non-static state, the target speed at the next moment is determined according to the current flight speed, the current flight height and the first preset hovering height of the aircraft and the remote control speed set for the aircraft by the remote control device, and the aircraft is controlled to fly according to the target speed, to ensure that the aircraft can hover in the air. If the aircraft currently adopts the relative hovering mode in the non-static state, the target speed at the next moment is determined according to the relative flight speed, the current flight height and the second preset hovering height of the aircraft in the non-static state and the remote control speed set for the aircraft by the remote control device, and the aircraft is controlled to fly according to the target speed, to ensure that the aircraft can synchronously fly with the non-static reference object, and the relative flight of the aircraft in the non-static state is achieved. Then, it is ensured that the aircraft is controlled in the non-static state to successfully fly in the above-mentioned two flight modes, and the flight safety of the aircraft is improved.

Further, the above-mentioned first mode operation module 420 may be configured to:

acquire the current horizontal flight speed and the current vertical flight speed of the aircraft;

determine a target horizontal speed of the aircraft according to the current horizontal flight speed and a horizontal remote control speed set for the aircraft by the remote control device;

determine a corresponding vertical adjusting speed based on a preset height adjustment rule according to the current flight height and the first preset hovering height; and determine a target vertical speed of the aircraft according to the current vertical flight speed, the vertical adjusting speed and a vertical remote control speed set for the aircraft by the remote control device.

Further, the above-mentioned relative flight speed of the aircraft in the non-static state includes a relatively horizontal flight speed and the current vertical flight speed, and the above-mentioned relatively horizontal flight speed may be determined by performing the following steps:

acquiring the current horizontal flight speed of the aircraft;

determining a first horizontal relative speed of the aircraft according to the current horizontal flight speed and the current speed of the remote control device;

determining a second horizontal relative speed of the aircraft according to a contrast of at least two images acquired by the aircraft in a flight process; and fusing the first horizontal relative speed and the second horizontal relative speed to obtain the relatively horizontal flight speed of the aircraft in the non-static state.

Further, the above-mentioned second mode operation module 430 may be configured to:

determine a target horizontal speed of the aircraft according to the relatively horizontal flight speed and the horizontal remote control speed set for the aircraft by the remote control device;

determine a corresponding vertical adjusting speed based on a preset height adjustment rule according to the current flight height and the second preset hovering height; and determine a target vertical speed of the aircraft according to the current vertical flight speed of the aircraft, the vertical adjusting speed and a vertical remote control speed set for the aircraft by the remote control device.

Further, the above-mentioned flight control device for the aircraft may further include:

a mode switching module configured to: control the flight mode of the aircraft to be switched into the absolute hovering mode if the current flight height of the aircraft is greater than or equal to a preset switching height.

Further, the above-mentioned flight control module 440 may be configured to:

generate a corresponding pulse width modulation signal according to the target speed; and control the aircraft to fly according to the pulse width modulation signal.

Further, the above-mentioned flight control device for the aircraft may further include:

an initialization module configure to initialize the aircraft according to state parameters of the aircraft under a preset takeoff standard.

The flight control device for the aircraft according to the present embodiment is applicable to the method of controlling the aircraft according to any above-mentioned embodiments and has the corresponding functions and beneficial effects.

Embodiment 5

Figure 5:
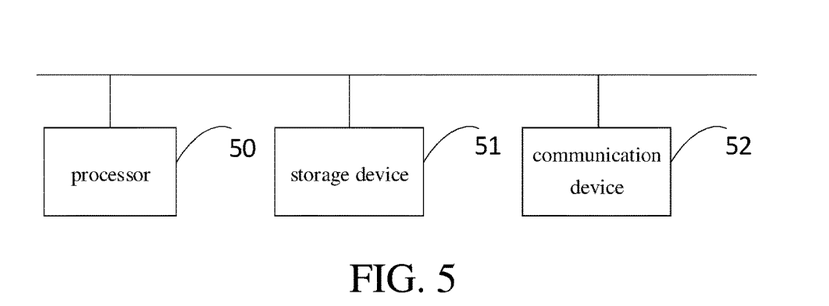
FIG. 5 is a schematic structural diagram of an aircraft according to an embodiment 5 of the present disclosure.

FIG. 5 is a schematic structural diagram of an aircraft according to an embodiment 5 of the present disclosure. As shown in FIG. 5, the aircraft includes a processor 50, a storage device 51 and a communication device 52. There may be one or more processors 50 in the aircraft, for example, there is one processor 50 in FIG. 5. The processor 50, the storage device 51 and the communication device 52 of the aircraft may be connected by a bus or in other manners, for example, bus connection is adopted in FIG. 5.

The storage device 51 serving as a computer readable storage medium may be used for storing software programs, computer executable programs and modules such as the corresponding modules in the method of controlling the aircraft in the embodiment of the present disclosure. By running of the software programs, instructions and modules stored in the storage device 51, the processor 50 executes various functional applications and data processing of the aircraft, that is, the method of controlling the aircraft is performed.

The storage device 51 may mainly include a program storage area and a data storage area, wherein the program storage area may be used for storing an operation system and at least one application required by a function. The data storage area may be used for storing data created according to the use of a terminal and the like. In addition, the storage device 51 may include a high-speed random access memory and may further include a non-volatile memory such as at least one magnetic disk storage device, flash memory device or other non-volatile solid-state storage devices. In some examples, the storage device 51 may further include memories remotely equipped relative to the processor 50, and these memories may be connected to the aircraft by a network. Examples of the above-mentioned network includes, but is not limited to the Internet, the Intranet, a local area network, a mobile communication network and combinations thereof.

The communication device 52 may be used for achieving network connection or mobile data connection between the aircraft and the remote control device.

The aircraft according to the present embodiment may be used for performing the method of controlling the aircraft according to any above-mentioned embodiments and has the corresponding functions and beneficial effects.

Embodiment 6

Embodiment 6 of the present disclosure further provides a computer readable storage medium for storing a computer program, wherein the program when executed by a processor causes the processor to perform the method of controlling the aircraft according to any above-mentioned embodiments. The method may include:

determining a flight mode currently adopted by the aircraft in a non-static state;

if the flight mode is an absolute hovering mode, determining a target speed of the aircraft according to a current flight speed, a current flight height and a first preset hovering height of the aircraft and a remote control speed set for the aircraft by remote control device;

if the flight mode is a relative hovering mode, determining the target speed of the aircraft according to a relative flight speed, the current flight height and a second preset hovering height of the aircraft in the non-static state and the remote control speed set for the aircraft by the remote control device; and controlling the aircraft to fly according to the target speed.

Of course, an embodiment of the present disclosure further provides a storage medium including a computer executable instruction, wherein the computer executable instruction is not limited to the operation of the above-mentioned method and may also be used for executing relevant operations in the flight control method for the aircraft according to any embodiments of the present disclosure.

According to the above-mentioned descriptions for the embodiments, the skilled in the art may clearly know that the present disclosure may be implemented by software and necessary general-purpose hardware, and of course, the present disclosure may also be implemented by hardware. However, the former is a better implementation in many cases. Based on such understanding, the technical solutions of the present disclosure substantively, or a part thereof making a contribution to the prior art, may be reflected in the form of a software product, and the computer software product may be stored in a computer readable storage medium such as a floppy disk of a computer, an ROM (Read-Only Memory), an RAM (Random Access Memory), a FLASH, a hard disk or optical disk and the like and includes several instructions to enable computer equipment (which may be a personal computer, a server, a network facility and the like) to execute the methods according to respective embodiments of the present disclosure.

It is noteworthy that all the units and modules in the embodiment of the flight control device of the aircraft are distinguished according to a functional logic, and may be distinguished in a manner which is not limited to the above-mentioned manner as long as the corresponding functions may be achieved. In addition, specific names of all the functional units are only for the purpose of facilitating mutual distinguishing, but are not intended to limit the protection scope of the present disclosure.

The above descriptions are not intended to limit the present disclosure, but are merely used as preferred embodiments thereof. Various alterations and changes for the present disclosure may be made by the skilled in the art. Any modifications, equivalent replacements, improvements and the like made within the spirit and principle of the present disclosure should fall within the protection scope of the present disclosure.

What is claimed is:

1. A method of controlling an aircraft, comprising:
determining a flight mode adopted by the aircraft in a non-static state;
in response to the flight mode being an absolute hovering mode, determining a target speed of the aircraft according to a current flight speed, a current flight height and a first preset hovering height of the aircraft and a remote control speed set for the aircraft by a remote control device, wherein absolute hovering mode means that: after taking off in the non-static state, the aircraft gradually and stably hover on a certain fixed position in the air and is no longer in flight;
in response to the flight mode being a relative hovering mode, determining the target speed of the aircraft according to a relative flight speed, the current flight height and a second preset hovering height of the aircraft in the non-static state and the remote control speed set for the aircraft by the remote control device, wherein the relative hovering mode means that the aircraft is gradually stabilized on a certain height in the air and synchronously fly with a non-static reference object after taking off in the non-static state; and
controlling the aircraft to fly according to the target speed;
wherein the relative flight speed of the aircraft in the non-static state comprises a relatively horizontal flight speed and the current vertical flight speed, and wherein determining the relatively horizontal flight speed comprises:
acquiring the current horizontal flight speed of the aircraft;
determining a first horizontal relative speed of the aircraft according to the current horizontal flight speed and the current speed of the remote control device, wherein the current horizontal flight speed is obtained by fusion performed by a satellite navigation module and an accelerometer;
determining a second horizontal relative speed of the aircraft according to a contrast of at least two images acquired by the aircraft in a flight process; and
acquiring a joystick operation information;
converting the joystick operation information into the remote control speed according to a mapping rule preconfigured;
obtaining a target horizontal speed of the aircraft at a next moment by the relatively horizontal flight speed of the aircraft is subtracted by the horizontal remote control speed set for the aircraft by the remote control device;
fusing the first horizontal relative speed and the second horizontal relative speed to obtain the relatively horizontal flight speed of the aircraft in the non-static state;
controlling the flight mode of the aircraft to be switched into the absolute hovering mode in response to the current flight height of the aircraft being greater than or equal to a preset switching height;
calculating a height difference of both the current flight height and the first preset hovering height in the absolute hovering mode; wherein the height difference is required to further ascend to ensure the aircraft reaches the first preset hovering height,
wherein the step of controlling the aircraft to fly according to the target speed comprises
generating a pulse width modulation signal according to the target speed, wherein before the step of determining the flight mode adopted by the aircraft in the non-static state, the method further comprises:
initializing the aircraft according to state parameters of the aircraft under a preset takeoff standard,
wherein the step of determining the target speed of the aircraft according to the relative flight speed, the current flight height and the second preset hovering height of the aircraft in the non-static state and the remote control speed set for the aircraft by the remote control device comprises:
determining a target horizontal speed of the aircraft according to the relatively horizontal flight speed and the horizontal remote control speed set for the aircraft by the remote control device;
determining a vertical adjusting speed based on a preset height adjustment rule according to the current flight height and the second preset hovering height, wherein the relatively horizontal flight speed is a horizontal component of a velocity vector.

2. The method according to claim 1, wherein the step of determining the target speed of the aircraft according to the current flight speed, the current flight height and the first preset hovering height of the aircraft and the remote control speed set for the aircraft by the remote control device comprises:
acquiring a current horizontal flight speed and a current vertical flight speed of the aircraft;

determining a target horizontal speed of the aircraft according to the current horizontal flight speed and the horizontal remote control speed set for the aircraft by the remote control device;

determining a vertical adjusting speed based on a preset height adjustment rule according to the current flight height and the first preset hovering height; and determining a target vertical speed of the aircraft according to the current vertical flight speed, the vertical adjusting speed and a vertical remote control speed set for the aircraft by the remote control device.

3. The method according to claim 1, wherein the step of controlling the aircraft to fly according to the target speed comprises:

controlling the aircraft to fly according to the pulse width modulation signal.

4. An aircraft, comprising:

one or more processors; and a storage device for storing one or more programs;

the one or more programs, when executed by the one or more processors, causing the one or more processors to:

determine a flight mode adopted by the aircraft in a non-static state;

in response to the flight mode being-an absolute hovering mode, determine a target speed of the aircraft according to a current flight speed, a current flight height and a first preset hovering height of the aircraft and a remote control speed set for the aircraft by a remote control device, wherein absolute hovering mode means that: after taking off in the non-static state, the aircraft gradually and stably hover on a certain fixed position in the air and is no longer in flight;

in response to the flight mode being a relative hovering mode, determine the target speed of the aircraft according to a relative flight speed, the current flight height and a second preset hovering height of the aircraft in the non-static state and the remote control speed set for the aircraft by the remote control device, wherein the relative hovering mode means that the aircraft is gradually stabilized on a certain height in the air and synchronously fly with a non-static reference object after taking off in the non-static state; and control the aircraft to fly according to the target speed;

wherein the relative flight speed of the aircraft in the non-static state comprises a relatively horizontal flight speed and the current vertical flight speed, and the one or more processors is further configured to:

acquire the current horizontal flight speed of the aircraft;

determine a first horizontal relative speed of the aircraft according to the current horizontal flight speed and the current speed of the remote control device, wherein the current horizontal flight speed is obtained by fusion performed by a satellite navigation module and an accelerometer;

determine a second horizontal relative speed of the aircraft according to a contrast of at least two images acquired by the aircraft in a flight process; and acquire a joystick operation information;

convert the joystick operation information into the remote control speed according to a mapping rule preconfigured;

obtain a target horizontal speed of the aircraft at the next moment by the relatively horizontal flight speed of the aircraft is subtracted by the horizontal remote control speed set for the aircraft by the remote control device;

fuse the first horizontal relative speed and the second horizontal relative speed to obtain the relatively horizontal flight speed of the aircraft in the non-static state;

control the flight mode of the aircraft to be switched into the absolute hovering mode in response to the current flight height of the aircraft being greater than or equal to a preset switching height;

calculate a height difference of both the current flight height and the first preset hovering height in the absolute hovering mode; wherein the height difference is required to further ascend to ensure the aircraft reaches the first preset hovering height, wherein the step of controlling the aircraft to fly according to the target speed comprises generating a pulse width modulation signal according to the target speed, wherein before the step of determining the flight mode adopted by the aircraft in the non-static state, the method further comprises:

initializing the aircraft according to state parameters of the aircraft under a preset takeoff standard, wherein the step of determining the target speed of the aircraft according to the relative flight speed, the current flight height and the second preset hovering height of the aircraft in the non-static state and the remote control speed set for the aircraft by the remote control device comprises:

determining a target horizontal speed of the aircraft according to the relatively horizontal flight speed and the horizontal remote control speed set for the aircraft by the remote control device;

determining a vertical adjusting speed based on a preset height adjustment rule according to the current flight height and the second preset hovering height.

5. The aircraft according to claim 4, wherein the one or more processors is further configured to:

acquire a current horizontal flight speed and a current vertical flight speed of the aircraft;

determine a target horizontal speed of the aircraft according to the current horizontal flight speed and the horizontal remote control speed set for the aircraft by the remote control device;

determine a vertical adjusting speed based on a preset height adjustment rule according to the current flight height and the first preset hovering height; and determine a target vertical speed of the aircraft according to the current vertical flight speed, the vertical adjusting speed and a vertical remote control speed set for the aircraft by the remote control device.

6. The aircraft according to claim 4, wherein the one or more processors is further configured to:

control the aircraft to fly according to the pulse width modulation signal.

7. A non-transitory computer readable storage medium for storing a computer program, wherein the program when executed by a processor, causes the processor to:

determine a flight mode adopted by the aircraft in a non-static state;

in response to the flight mode being an absolute hovering mode, determine a target speed of the aircraft according to a current flight speed, a current flight height and a first preset hovering height of the aircraft and a remote control speed set for the aircraft by a remote control device, wherein absolute hovering mode means that: after taking off in the non-static state, the aircraft gradually and stably hover on a certain fixed position in the air and is no longer in flight;

in response to the flight mode being a relative hovering mode, determine the target speed of the aircraft according to a relative flight speed, the current flight height and a second preset hovering height of the aircraft in the non-static state and the remote control speed set for the aircraft by the remote control device, wherein the relative hovering mode means that the aircraft is gradually stabilized on a certain height in the air and synchronously fly with a non-static reference object after taking off in the non-static state; and control the aircraft to fly according to the target speed;

wherein a relative flight speed of the aircraft in the non-static state comprises a relatively horizontal flight speed and the current vertical flight speed, and the one or more processors is further configured to:

acquire the current horizontal flight speed of the aircraft;

determine a first horizontal relative speed of the aircraft according to the current horizontal flight speed and the current speed of the remote control device, wherein the current horizontal flight speed is obtained by fusion performed by a satellite navigation module and an accelerometer;

determine a second horizontal relative speed of the aircraft according to a contrast of at least two images acquired by the aircraft in a flight process; and acquire a joystick operation information;

convert the joystick operation information into the remote control speed according to a mapping rule preconfigured;

obtain a target horizontal speed of the aircraft at the next moment by the relatively horizontal flight speed of the aircraft is subtracted by the horizontal remote control speed set for the aircraft by the remote control device;

fuse the first horizontal relative speed and the second horizontal relative speed to obtain the relatively horizontal flight speed of the aircraft in the non-static state;

controlling the flight mode of the aircraft to be switched into the absolute hovering mode in response to the current flight height of the aircraft being greater than or equal to a preset switching height;

calculating a height difference of both the current flight height and the first preset hovering height in the absolute hovering mode; wherein the height difference is required to further ascend to ensure the aircraft reaches the first preset hovering height, wherein the step of controlling the aircraft to fly according to the target speed comprises generating a pulse width modulation signal according to the target speed, wherein before the step of determining the flight mode adopted by the aircraft in the non-static state, the method further comprises:

initializing the aircraft according to state parameters of the aircraft under a preset takeoff standard, wherein the step of determining the target speed of the aircraft according to the relative flight speed, the current flight height and the second preset hovering height of the aircraft in the non-static state and the remote control speed set for the aircraft by the remote control device comprises:

determining a target horizontal speed of the aircraft according to the relatively horizontal flight speed and the horizontal remote control speed set for the aircraft by the remote control device;

determining a vertical adjusting speed based on a preset height adjustment rule according to the current flight height and the second preset hovering height.

8. The non-transitory computer readable storage medium according to claim 7, wherein the processor is further configured to:

acquire a current horizontal flight speed and a current vertical flight speed of the aircraft;

determine a target horizontal speed of the aircraft according to the current horizontal flight speed and the horizontal remote control speed set for the aircraft by the remote control device;

determine a vertical adjusting speed based on a preset height adjustment rule according to the current flight height and the first preset hovering height; and determine a target vertical speed of the aircraft according to the current vertical flight speed, the vertical adjusting speed and a vertical remote control speed set for the aircraft by the remote control device.

9. The non-transitory computer readable storage medium according to claim 7, wherein the processor is further configured to:

control the aircraft to fly according to the pulse width modulation signal.

* * * * *